US012749436B2

(12) United States Patent
Hyeon et al.

(10) Patent No.: US 12,749,436 B2
(45) Date of Patent: Sep. 29, 2026

(54) DISPLAY APPARATUS AND SCANNING METHOD THEREOF

(71) Applicant: SAMSUNG ELECTRONICS CO., LTD., Suwon-si (KR)

(72) Inventors: Byeongcheol Hyeon, Suwon-si (KR); Dooyoung Kim, Suwon-si (KR); Jaehyang Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/083,051

(22) Filed: Mar. 18, 2025

(65) Prior Publication Data

US 2025/0372027 A1 Dec. 4, 2025

Related U.S. Application Data

(63) Continuation of application No. PCT/KR2025/002218, filed on Feb. 14, 2025.

(30) Foreign Application Priority Data

May 31, 2024 (KR) ........................ 10-2024-0071939

(51) Int. Cl.
*G09G 3/32* (2016.01)

(52) U.S. Cl.
CPC ....... *G09G 3/32* (2013.01); *G09G 2300/0408* (2013.01); *G09G 2310/08* (2013.01); *G09G 2320/0247* (2013.01)

(58) Field of Classification Search
CPC ........................................................ G09G 3/32
See application file for complete search history.

(56) References Cited

U.S. PATENT DOCUMENTS

| | | | | |
|---|---|---|---|---|
| 8,314,818 | B2 | 11/2012 | Kang | |
| 9,552,789 | B2 | 1/2017 | Lee et al. | |
| 10,262,612 | B2 | 4/2019 | Wang | |
| 10,460,650 | B2 | 10/2019 | Hyeon | |
| 10,741,118 | B2 | 8/2020 | Park et al. | |
| 11,094,266 | B2 | 8/2021 | Heo et al. | |
| 2013/0145341 | A1* | 6/2013 | Yoshikawa | G06F 30/33 716/136 |
| 2014/0362073 | A1* | 12/2014 | Huang | G09G 3/3674 345/99 |
| 2015/0332624 | A1* | 11/2015 | Zhang | G09G 3/2096 345/204 |

(Continued)

FOREIGN PATENT DOCUMENTS

| | | |
|---|---|---|
| JP | 4938831 | 5/2012 |
| KR | 10-2015-0043863 | 4/2015 |
| KR | 10-2018-0050125 | 5/2018 |

(Continued)

*Primary Examiner* — Nan-Ying Yang
(74) *Attorney, Agent, or Firm* — STAAS & HALSEY LLP

(57) ABSTRACT

A display device including a display including a plurality of light emitting devices (LEDs) arranged in a plurality of lines; a scan integrated circuit (IC) configured to scan the plurality of lines in which the plurality of LEDs are arranged; and a controller is configured to apply, to the scan IC, a control signal including a plurality of clock intervals having different frequencies, wherein, based on the control signal received from the controller, the scan IC non-sequentially scans the plurality of lines.

15 Claims, 11 Drawing Sheets

(56) References Cited

U.S. PATENT DOCUMENTS

| | | | | |
|---|---|---|---|---|
| 2017/0069270 | A1* | 3/2017 | Hyeon | G09G 3/3216 |
| 2018/0114566 | A1* | 4/2018 | Aoyama | H04N 13/332 |

FOREIGN PATENT DOCUMENTS

| | | |
|---|---|---|
| KR | 10-2019-0014080 | 2/2019 |
| KR | 10-2472193 | 11/2022 |
| KR | 10-2539185 | 6/2023 |
| KR | 10-2556899 | 7/2023 |

* cited by examiner

DISPLAY APPARATUS AND SCANNING METHOD THEREOF

CROSS-REFERENCE TO RELATED APPLICATIONS

This application is a continuation of International Application No. PCT/KR2025/002218 designating the United States, filed on Feb. 14, 2025, in the Korean Intellectual Property Receiving Office, and claiming priority to Korean Patent Application No. 10-2024-0071939, filed on May 31, 2024, in the Korean Intellectual Property Office, the disclosures of each of which are incorporated by reference herein in their entireties.

BACKGROUND

Field

The present disclosure relates to a display device for scanning a light emitting device (LED) and a scanning method thereof.

Description of Related Art

As electronic technology advances, the distribution of various display devices using light emitting device (LEDs) is also increasing.

The display device using the LED may emit light while/by sequentially scanning the plurality of LEDs in a line unit.

This method may be referred to as a sequential scan method. The sequential scan method may be a common driving method used for a display using the LEDs as pixels, which may lead to a flicker phenomenon.

If a user visually perceives the flickering phenomenon occurring in the display device, the user may experience visual discomfort.

SUMMARY

Aspects of embodiments of the disclosure will be set forth in part in the description which follows and, in part, will be apparent from the description, or may be learned by practice of the presented embodiments.

According to an embodiment of the disclosure, a display device includes a display including a plurality of light emitting devices (LEDs) arranged in a plurality of lines; a scan integrated circuit (IC) configured to scan the plurality of lines in which the plurality of LEDs are arranged; and a controller is configured to apply, to the scan IC, a control signal including a plurality of clock intervals having different frequencies, wherein, based on the control signal received from the controller, the scan IC non-sequentially scans the plurality of lines.

According to an embodiment of the disclosure, the scan IC may be configured to sequentially scan the plurality of lines. The controller may be configured to generate the control signal, in which a first clock interval of the plurality of clock intervals having different frequencies and a second clock interval of the plurality of clock intervals having different frequencies are alternately disposed based on a predetermined scanning order, and apply the generated control signal to the scan IC for the scan IC to non-sequentially scan the plurality of lines. A frequency of a second clock signal included in the second clock interval may be higher than a frequency of a first clock signal included in the first clock interval.

According to an embodiment of the disclosure, the first clock signal may be repeated in the first clock interval a predetermined number of times, and the second clock signal may be repeated in the second clock interval the predetermined number of times. The scan IC may be configured to, if the first clock signal is received, apply a first scan signal to one line among the plurality of lines based on the first clock signal while the first clock signal is repeated consecutively the predetermined number of times, and, if the second clock signal is received after the received first clock signal is repeated consecutively the predetermined number of times, apply a second scan signal to a next line among the plurality of lines based on the second clock signal while the second clock signal is repeated consecutively the predetermined number of times. A time during which the first scan signal is applied may be greater than or equal to a threshold time for turning on LEDs among the plurality of LEDs included in each respective line among the plurality of lines. A time during which the second scan signal is applied may be less than the threshold time.

According to an embodiment of the disclosure, the controller may include a first clock generation circuit configured to generate the first clock signal, a second clock generation circuit configured to generate the second clock signal, a multiplexer (MUX) circuit, a counter circuit, and a register storing information on the predetermined scanning order. The counter circuit may be configured to transmit a sequence signal corresponding to the information stored in the register to the MUX circuit. The MUX circuit may be configured to generate the control signal by multiplexing the first clock signal with the second clock signal based on the sequence signal.

According to an embodiment of the disclosure, the controller may include a register storing information on the predetermined scanning order, a counter circuit configured to output a sequence signal corresponding to the information stored in the register, and a variable clock generation circuit configured to selectively output the first clock signal and the second clock signal based on the sequence signal.

According to an embodiment of the disclosure, the information on the predetermined scanning order stored in the register may be one of sequential operation information for sequentially scanning the plurality of lines or non-sequential operation information for performing the non-sequential operation on the plurality of lines in a predetermined number of lines among the plurality of lines. The scanning order information may be updatable.

According to an embodiment of the disclosure, the controller may be configured to apply, to the scan IC, the control signal for sequentially scanning odd lines among the plurality of lines and then sequentially scanning even lines among the plurality of lines. The control signal may sequentially dispose the first clock interval corresponding to a line to be scanned among the plurality of lines and the second clock interval corresponding to a line not to be scanned among the plurality of lines.

According to an embodiment of the disclosure, the controller may be configured to apply, to the scan IC, the control signal for sequentially scanning the plurality of lines by hopping a predetermined number of lines among the plurality of lines, and then sequentially scanning remaining lines among the plurality of lines by hopping the predetermined number of lines. The control signal may sequentially dispose the first clock interval corresponding to a line to be scanned among the plurality of lines and the second clock interval corresponding to a line not to be scanned among the plurality of lines. The predetermined number may be two, three, or four.

According to an embodiment of the disclosure, a scanning operation period for all of the plurality of lines may include a first scanning operation period for some lines among the plurality of lines and at least one second scanning operation period for some other lines among the plurality of lines. The controller may be configured to apply, to the scan IC, the control signal for scanning the plurality of lines by hopping at least one line among the plurality of lines during the first scanning operation period, and then scanning remaining lines among the plurality of lines by hopping at least one line among the plurality of lines during the at least one second scanning operation period. The control signal may sequentially dispose the first clock interval corresponding to a line to be scanned among the plurality of lines and the second clock interval corresponding to a line not to be scanned among the plurality of lines.

According to an embodiment of the disclosure, a scanning operation period for all of the plurality of lines may include a first scanning operation period for some lines among the plurality of lines and at least one second scanning operation period for some other lines among the plurality of lines. The controller may be configured to adjust the scanning order differently for each of the first scanning operation period and the second scanning operation period.

According to an embodiment of the disclosure, provided is a scanning method of a display device, which includes a plurality of light emitting devices (LEDs) arranged in a plurality of lines, and a scan integrated circuit (IC) configured to scan the plurality of lines in which the plurality LEDs are arranged, the method including applying, to the scan IC, a control signal including a plurality of clock intervals having different frequencies; and, based on the applied control signal, non-sequentially scanning, by the scan IC, the plurality of lines.

According to an embodiment of the disclosure, the scan IC may be configured to sequentially scan the plurality of lines. The applying of the control signal to the scan IC may include generating the control signal, in which a first clock interval of the plurality of clock intervals having different frequencies and a second clock interval of the plurality of clock intervals having different frequencies are alternately disposed based on a predetermined scanning order. A frequency of a second clock signal included in the second clock interval may be higher than a frequency of a first clock signal included in the first clock interval.

According to an embodiment of the disclosure, the first clock signal may be repeated in the first clock interval a predetermined number of times, and the second clock signal may be repeated in the second clock interval the predetermined number of times. The non-sequential scanning may include if the first clock signal is received, applying a first scan signal to one line among the plurality of lines based on the first clock signal while first clock signal is repeated consecutively the predetermined number of times, and, if the second clock signal is received after the received first clock signal is repeated consecutively the predetermined number of times, applying a second scan signal to a next line among the plurality of lines based on the second clock signal while the second clock signal is repeated consecutively the predetermined number of times. A time during which the first scan signal is applied may be greater than or equal to a threshold time for turning on LEDs among the plurality of LEDs included in each respective line among the plurality of lines. A time during which the second scan signal is applied may be less than the threshold time.

According to an embodiment of the disclosure, the generating of the control signal may include generating the first clock signal and the second clock signal, respectively, and generating the control signal by multiplexing the first clock signal with the second clock signal based on scanning order information stored in a register.

According to an embodiment of the disclosure, the generating of the control signal may include generating the first clock signal and the second clock signal by controlling a variable clock generation circuit based on scanning order information stored in a register.

BRIEF DESCRIPTION OF THE DRAWINGS

These and/or other aspects of the disclosure will become apparent and more readily appreciated from the following description of embodiments, taken in conjunction with the accompanying drawings listed below.

DETAILED DESCRIPTION

Figure 1:
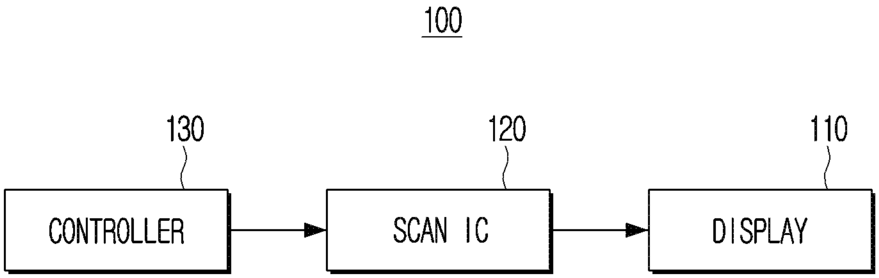
FIG. 1 is a block diagram showing a configuration of a display device according to an embodiment of the disclosure.

General terms currently widely used are selected as terms used in various embodiments of the present disclosure in consideration of their functions in the present disclosure, and may be changed based on the intentions of those skilled in the art or a judicial precedent, the emergence of a new technique, or the like. In addition, in a specific case, terms arbitrarily chosen by an applicant may exist. In this case, the meanings of such terms are mentioned in detail in corresponding descriptions of the present disclosure. Therefore, the terms used in the present disclosure need to be defined on the basis of the meanings of the terms and the contents throughout the present disclosure rather than simple names of the terms.

It should be understood that the various embodiments of the present disclosure and terms used herein are not intended to limit technical features described in the present disclosure to specific embodiments, and include various modifications, equivalents, and substitutions of the corresponding embodiments.

Throughout the accompanying drawings, similar or related components are denoted by similar reference numerals.

A singular noun corresponding to an item is intended to include one or more of the items, unless a relevant context clearly indicates otherwise.

In the present disclosure, an expression “A or B”, “at least one of A and B”, “at least one of A or B”, “A, B, or C”, “at least one of A, B, and C”, “at least one of A, B, or C”, or the like may include any one of the items enumerated together or all possible combinations thereof.

A term “and/or” includes any combination of a plurality of related components or any one of the plurality of related components, described herein.

A term such as “first” or “second” may be used simply to distinguish one element from another element, and does not limit the corresponding component in any other respect (e.g., importance or order).

It should be understood that terms “include”, “have” or the like specify the presence of features, numerals, steps, operations, components, parts, or combinations thereof, described in the present disclosure, and do not preclude the presence or addition of one or more other features, numerals, steps, operations, components, parts, or combinations thereof.

If a component is referred to as being “connected”, “coupled”, “supported”, or “in contact” with another component, it includes not only a case where the components are directly connected, coupled, supported, or in contact with each other, but also a case where the components are indirectly connected, coupled, supported, or in contact with each other through a third component.

If a component is referred to as being disposed “on” another component, it includes not only a case where the component is in contact with another component, but also a case where yet another component is present between the two components.

Hereinafter, an embodiment of the present disclosure is described in more detail with reference to the accompanying drawings.

FIG. 1 is a block diagram showing a configuration of a display device according to an embodiment.

Referring to FIG. 1, a display device 100 may include a display 110, a scan integrated circuit (IC) 120, and a controller 130.

The display device 100 may be a device that outputs an image through the display 110. The display device 100 may be implemented as a television (TV), is not limited thereto, and may be applied to any device having a display function without limitation such as a video wall, a large format display (LFD), a digital signage, a digital information display (DID), or a projector display. Alternatively, the display device 100 may not be implemented only as any of the various independent devices described above, but may also be implemented in the form of a display panel or module applicable to such a device.

The display device 110 may be implemented as any of various forms of displays, such as a liquid crystal display (LCD) panel, an organic light-emitting diode (OLED) panel, a liquid crystal on silicon (LCoS) panel, a digital light processing (DLP) panel, a quantum dot (QD) display panel, a quantum dot light-emitting diode (QLED) panel, a micro light-emitting diode (μLED) panel, or a mini-LED panel.

Meanwhile, the display 110 may also be implemented as a touch screen coupled with a touch sensor, a flexible display, a rollable display, a three-dimensional (3D) display, a display in which the plurality of display modules are physically connected with each other, or the like.

The various disclosures below describe a case where the display device 100 is implemented by including a plurality of light-emitting elements such as LEDs.

In this case, the display 110 may include a plurality of LED lines. Each line may have the plurality of LEDs. The display device 100 may scan all the LEDs in a line unit. In the present disclosure, scanning in the line unit indicates an operation of simultaneously scanning and emitting the plurality of LEDs arranged in one line, is not necessarily limited thereto, and may also include performing the scanning in the plurality of line units.

The LEDs included in each LED line may include a plurality of sub LEDs that express different colors. As an example, each LED may include three sub-LEDs such as red (R), green (G), and blue (B), along with a sub-pixel circuit, or the like.

The scan integrated circuit (IC) 120 is a component for scanning the plurality of LEDs in the line unit. The scan integrated circuit (IC) 120 may apply a scan signal to each LED line based on a control signal provided from the controller 130.

The controller 130 is a component for controlling an operation of the display 110. The controller 130 may generate the control signal that causes the scan IC 120 described above to scan each of the plurality of LED lines. The controller 130 may be electrically connected to the scan IC 120 and may apply the generated control signal.

For example, the controller 130 may be a timing controller. The timing controller indicates a device that generates and manages a clock signal and a timing signal. The above-described control signal may include a clock signal generated by the timing controller. In detail, the control signal may be the clock signal of a single frequency, is not limited thereto, and may be a signal in which clocks of various frequencies are alternately arranged based on a predetermined scanning order. Here, the predetermined scanning order and control signal are described in detail in a description provided below.

The scan IC 120 may scan the plurality of LEDs included in the display 110 in the line unit based on the control signal if the controller 130 generates the control signal and applies the same to the scan IC 120. The above-described flicker phenomenon may be significantly improved if the scan IC non-sequentially scans the plurality of LEDs. The non-sequential scanning indicates that the plurality of LED lines are not sequentially scanned. For example, if the display 110 has n lines, scanning the first, second, third, and nth lines in an order may be referred to as sequential scanning, and operations such as first scanning odd lines such as the first, third, and fifth lines, and then scanning even lines such as the second, fourth, and sixth, or scanning by hopping two or more lines may be referred to as the non-sequential scanning. A non-sequential scanning method may be set in various ways, and this configuration is described in detail in a description provided below.

The scan IC itself needs to be designed for the non-sequential scanning to perform the non-sequential scanning. However, it is common for conventional display devices to perform the sequential scanning, and many conventional scan ICs are thus also designed for a sequential scanning purpose.

If the scan IC 120 is the IC designed to sequentially scan the plurality of LEDs in the line unit, the controller 130 may perform the non-sequential scanning by applying, to the scan IC 120, the control signal including a plurality of clock intervals having different frequencies. This control signals may also be referred to as a mixed clock.

A scanning operation of the display device 100 is described below in detail with reference to FIG. 2.

Figure 2:
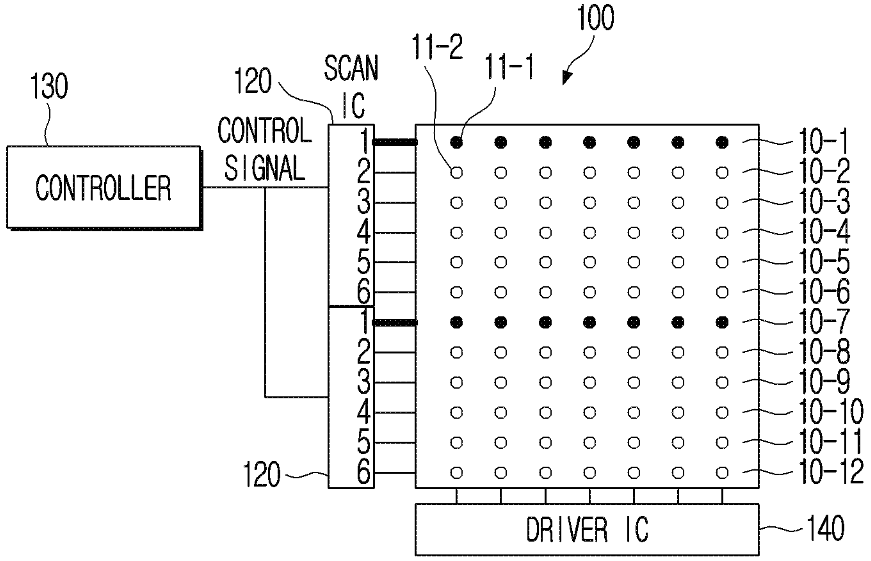
FIG. 2 is a diagram for describing an operation of the display device according to an embodiment of the disclosure.

FIG. 2 is a diagram for describing the operation of the display device according to an embodiment.

Referring to FIG. 2, the display 110 may include a plurality of LEDs 11-1 and 11-2 disposed for each of a plurality of lines 10. For convenience of description, the following description describes an identifier code for any LED as 11.

The display 110 may include the plurality of horizontal lines 10 and a plurality of vertical lines arranged in one direction.

FIG. 2 shows that the plurality of horizontal lines 10 are connected to the scan IC 120 and the plurality of vertical lines are connected to a driver IC 140, the present disclosure is not necessarily limited thereto, and the vertical line may be connected to the scan IC 120 and the horizontal line may be connected to the driver IC 140 based on a design of the display 110.

FIG. 2 shows that the display 110 includes the plurality of LEDs distributed in a matrix form, and all the LEDs are arranged along twelve horizontal lines 10-1 to 10-12 and seven vertical lines, which are shown arbitrarily for the convenience of description, and the number of horizontal lines and the number of vertical lines may be variously changed. That is, the display 110 may include a variable number of horizontal lines 10, vertical lines and LEDs based on the number of output pins of the scan IC 120 or a size of the display 110, or the like. The horizontal line 10 may otherwise be referred to as a gate line, a scan line, or the like, and the vertical line may otherwise be referred to as a data line, a driving line, or the like. Alternatively, to classify the lines, the horizontal line 10 may be described as line 1 and the vertical line may be described as line 2. In the present disclosure, the term "line" may refer to either the horizontal line or the vertical line, and hereinafter, the line is shown and described as the horizontal line 10 for the convenience of description.

The scan IC 120 may be connected to each line 10 included in the display 110.

The scan IC 120 may include an input pin for receiving the control signal of the controller 130 and the output pin for controlling a scanning switch of each line based on the control signal.

Referring to FIG. 2, the upper scan IC 120 may be connected to the first to sixth lines 10-1 to 10-6 from the top of the display 110, and the lower scan IC 120 may be connected to the seventh to twelfth line 10-7 to 10-12 from the top of the display 110. As shown in FIG. 2, the plurality of scan ICs 120 may scan all the lines 10 by dividing the lines if the number of lines 10 exceeds the number of lines capable of being scanned by a single scan IC 120.

In this way, FIG. 2 shows two scan ICs 120 each including six output pins for the total of twelve lines 10-1 to 10-12. However, the present disclosure is not limited thereto, and may include a variable number of scan ICs 120 based on the number of lines 10 included in the display 110 and the number of the output pins included in each scan IC 120.

The controller 130 may generate the control signal and apply the same to the scan IC 120. The controller 130 may apply the same control signal to the plurality of scan ICs 120 if the controller 130 is connected to the plurality of scan ICs 120 disposed together.

The control signal is the signal that causes the scan IC 120 described above to scan the plurality of lines 10. The control signal may determine an order of supplying an electrical signal, i.e., scan signal, to each of the plurality of LED lines 10. The scan IC 120 may scan the plurality of lines 10 line by line based on this control signal.

The display device 100 may further include the driver integrated circuit (IC) 140. The driver IC 140 may be connected to the display 110 and supply power to each of the plurality of LED lines 10 based on the control signal described above.

In detail, the driver IC 140 may supply power to and turn on each of the plurality of LEDs 11-1 included in the scanned first line if the scan IC 120 scans the first line 10-1. Here, the plurality of LEDs 11-2 included in the second line 10-2 may be in a turn-off state 11-2. The driver IC 140 may turn on the plurality of LEDs 11-2 included in the second line 10-2 if the scan IC 120 scans the second line 10-2 based on the control signal after a certain time.

That is, the plurality of LEDs 11 may be arranged on the substrate in the matrix form, and a wiring layer including wiring for connection to the anode electrode and cathode electrode of each LED 11 may be formed on the substrate. The wiring layer may include horizontal line wiring for electrical connection to the plurality of LEDs in the line unit in a horizontal direction, and vertical line wiring for electrical connection to the plurality of LEDs in the line unit in a vertical direction. The scan IC 120 may apply the scan signal for turning on a transistor switch in each LED through the horizontal line, and the driver IC 140 may apply a power supply voltage (VDD) and a ground voltage (VSS) to each LED through the vertical line. The LED disposed at an intersection of the horizontal line and the vertical line may emit light if the transistor switch is turned on by the scan signal while the VDD and the VSS are applied.

Meanwhile, the horizontal line and the vertical line connected to one LED may be applied to each sub LED through a separate line provided for each sub LED if one LED (i.e., pixel) includes the plurality of sub LEDs (i.e., sub pixels) as described above.

As described above, the scan IC 120 may be designed to sequentially scan the plurality of lines (i.e., 10-1 to 10-6 or 10-7 to 10-12). However, the controller 130 may control the scan IC 120 to perform the non-sequential scanning by applying the control signal including the plurality of clock intervals having different frequencies to the scan IC 120.

Figure 3:
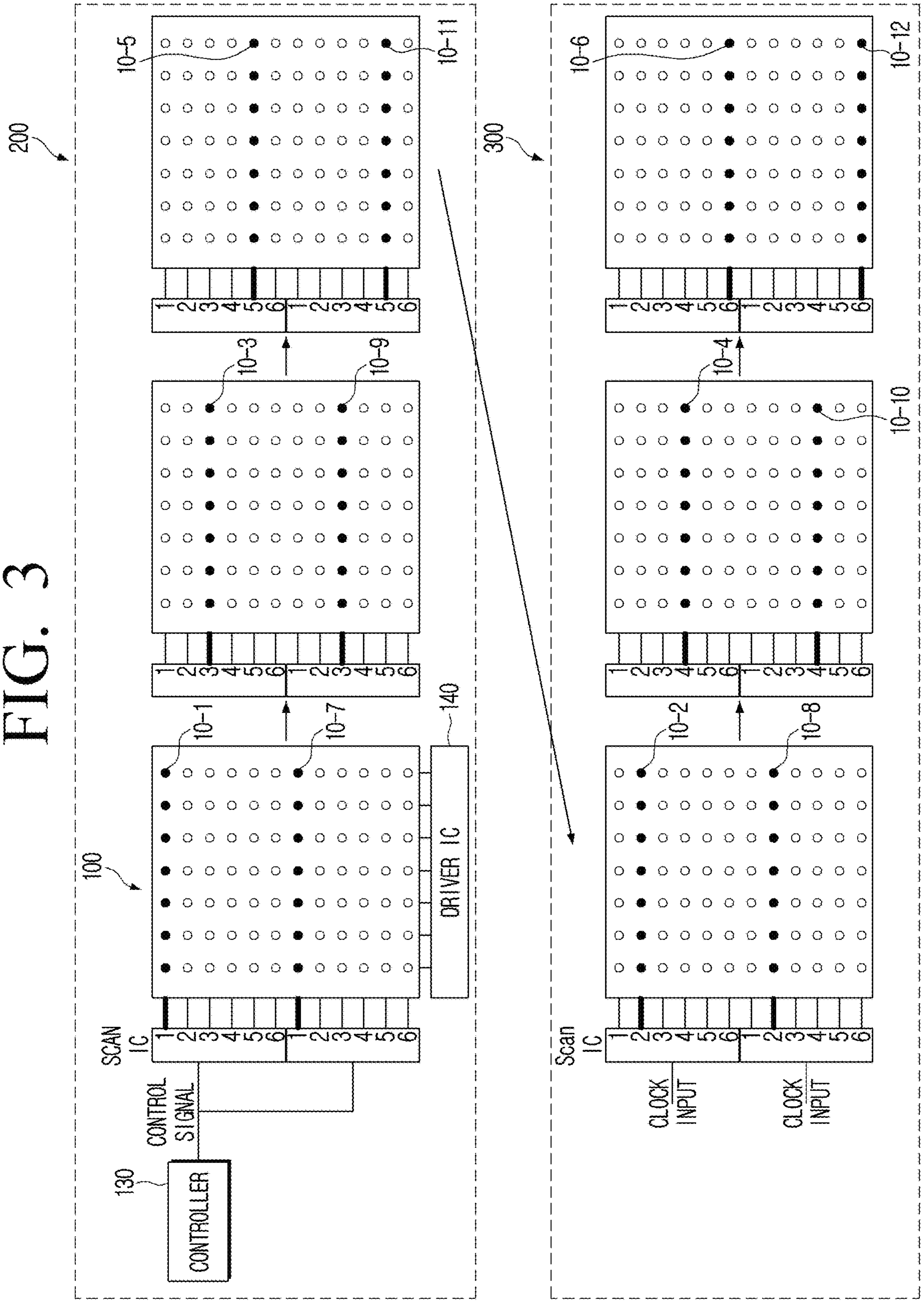
FIG. 3 is a diagram for describing a non-sequential scanning operation of the display device according to an embodiment of the disclosure.

FIG. 3 is a diagram for describing a non-sequential scanning operation of the display device according to an embodiment.

Referring to FIG. 3, the scan IC 120 may scan each line 10 of the display 110 based on the control signal applied by the controller 130.

Two scan ICs 120 may scan twelve lines 10 included in the display 110 in six steps if the display device 100 includes two scan ICs 120.

Unlike what is shown in FIG. 3, if each scan IC 120 sequentially scans each line 10, each scan IC 120 may scan the first line 10-1 or 10-7 in a first step, the second line 10-2 or 10-8 in a second step, the third line 10-3 or 10-9 in a third step, the fourth line 10-4 or 10-10 in a fourth step, the fifth line 10-5 or 10-11 in a fifth step, and the sixth line 10-6 or 10-12 in a sixth step.

The controller 130 may control each scan IC 120 to non-sequentially scan each line 10 by applying the control signal described above to the scan IC 120 designed to be operated in this manner. FIG. 3 shows a case where odd lines are scanned first and then even lines are scanned.

In detail, each scan IC 120 may scan the first line 10-1 or 10-7 in the first step, the third line 10-3 or 10-9 in the second step, the fifth line 10-5 or 10-11 in the third step, the second line 10-2 or 10-8 in the fourth step, the fourth line 10-4 or 10-10 in the fifth step, and the sixth line 10-6 or 10-12 in the sixth step.

A period during which all the lines are scanned once may be referred to as a scanning operation period. In this case, if each scan IC 120 non-sequentially scans each line 10, one scanning operation period may be classified into a first scanning operation period 200 including the first to third steps among the six steps and a second scanning operation period 300 including the fourth to sixth steps. During the first scanning operation period 200, the scan IC 120 may scan odd lines 10-1, 10-3, 10-5, 10-7, 10-9, and 10-11, and during the second scanning operation period 300, the scan IC 120 may scan even line 10-1, 10-3, 10-5, 10-7, 10-9, and 10-11. Here, the first scanning operation period 200 and the second scanning operation period 300 may each be referred to as a cycle. Here, one cycle indicates an operation period during which the scan IC 120 applies the scan signal to all the lines 10 once based on the control signal. The scan signal mentioned here is described in detail in a description provided below.

For example, the entire scanning operation period may include two cycles: a first cycle for scanning the odd lines 10-1, 10-3, 10-5, 10-7, 10-9, and 10-11 and a second cycle for scanning the even lines in case of scanning the odd lines 10-1, 10-3, 10-5, 10-7, 10-9, and 10-11 and then scanning the even lines.

For example, if the scan IC 120 non-sequentially scans the plurality of lines 10 included in the display 110, the adjacent line 10-2 may be scanned half a period after the plurality of LEDs of the first line 10-1 are turned off, thus improving the flicker problem that may occur in the sequential scanning method.

FIG. 3 shows the case where the display device 100 includes two scan ICs 120, and each scan IC 120 scans six lines, which is only an example, and the display device 100 may implement various non-sequential scanning operations based on the number of lines 10 and the number of scan ICs 120 included in the display 110.

Meanwhile, the display device 100 may include a non-sequential driving scan IC. The non-sequential driving scan IC may non-sequentially scan the plurality of lines 10 included in the display 110 based on a clock signal having a constant frequency.

On the other hand, according to the various embodiments of the present disclosure as described above, the plurality of lines 10 may be non-sequentially scanned even if the display device 100 uses the scan IC 120 designed for sequential driving. In detail, the controller 130 may implement the non-sequential scanning by applying the control signal in which different clocks are mixed with each other to the scan IC 120. Therefore, the flicker phenomenon may be improved without any need to separately have the non-sequential driving scan IC. As a result, the display device 100 may improve an image quality while increasing its compatibility with an existing display component and reducing its manufacturing cost.

Figure 4A:
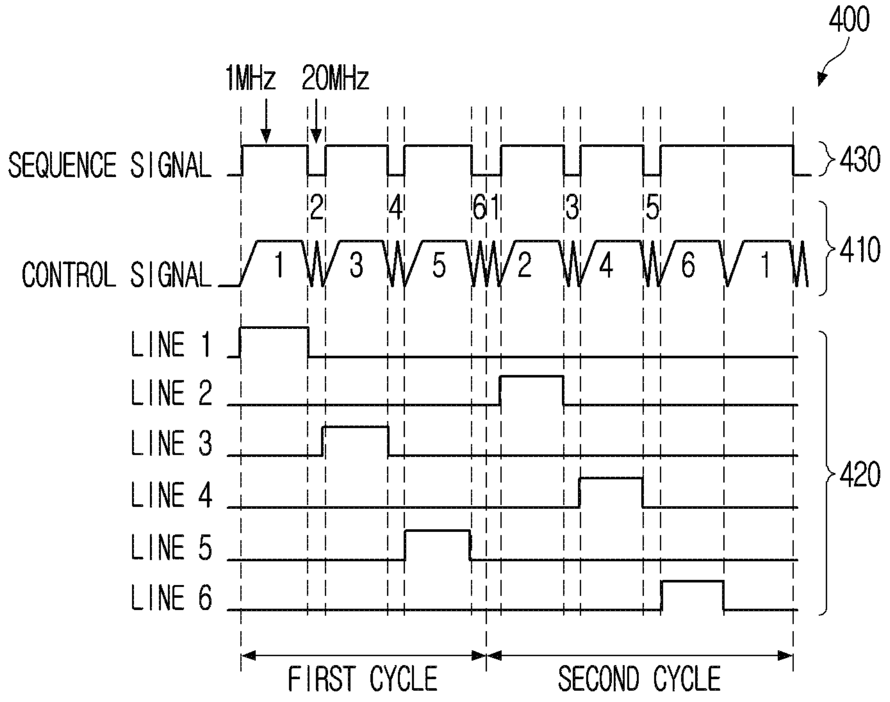
FIG. 4A is a diagram for describing a control signal according to an embodiment of the disclosure.
Figure 4B:
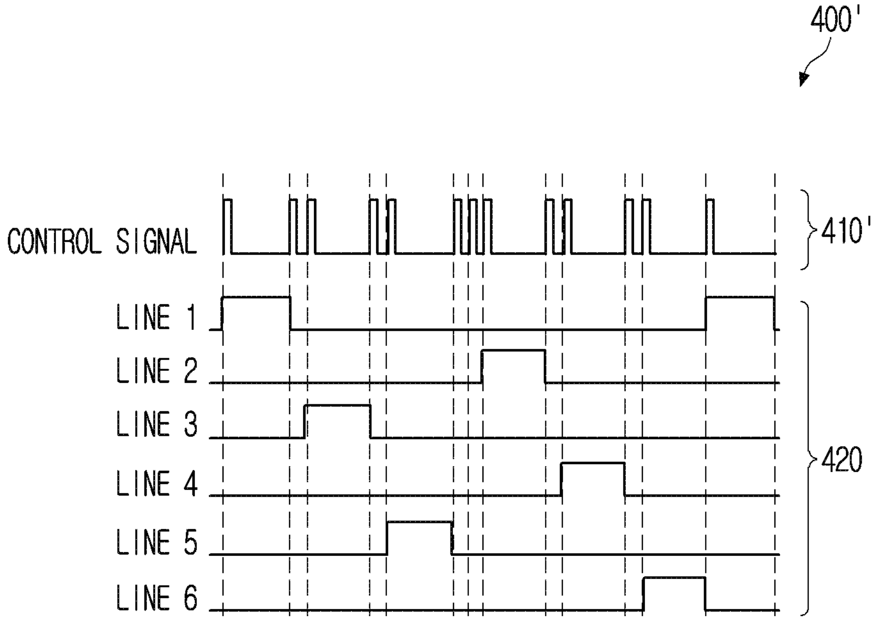
FIG. 4B is a diagram for describing a control signal according to an embodiment of the disclosure.

FIGS. 4A and 4B are diagrams for describing the control signal according to the various embodiments.

A graph 400 shown in FIG. 4A shows magnitudes of a control signal 410, a scan line voltage 420, and a sequence signal 430 over time. Here, the magnitude of each signal indicates a voltage. The scan signal applied to each line, i.e., scan line voltage 420, may be changed over time based on the control signal 410, and the control signal 410 may be changed over time based on the sequence signal 430.

The controller 130 may generate the sequence signal 430. The sequence signal 430 may include information on the predetermined scanning order. The sequence signal 430 may alternately repeat high and low values based on the predetermined scanning order. Here, the predetermined scanning order may be an order in which the scan IC 120 scans each line 10.

The controller 130 may output the control signal 410 based on the sequence signal 430. In detail, the controller 130 may output the control signal 410 based on a low-frequency clock signal of about 1 MHz while the sequence signal 430 remains in a high state. On the other hand, the controller 130 may output the control signal 410 based on a high-frequency clock signal of about 20 MHz while the sequence signal 430 remains in a low state. FIG. 4A shows the frequency of the low-frequency clock signal as 1 MHz and the frequency of the high-frequency clock signal as 20 MHz, respectively. However, numerical values of the frequencies may be set differently.

In this way, the controller 130 may output the control signal 410 including the plurality of clock intervals having different frequencies. Each of the plurality of clock intervals may be one of a first clock interval or a second clock interval.

The control signal 410 may be a signal for sequentially disposing the first clock interval corresponding to a line to be scanned among the plurality of lines and the second clock interval corresponding to a line not to be scanned among the plurality of lines.

In detail, a first clock signal included in the first clock interval may be the above-described low-frequency clock signal, and a second clock signal included in the second clock interval may be the above-described high-frequency clock signal. The first clock signal and the second clock signal may have the same amplitude.

As shown in FIG. 4A, the first clock interval and the second clock interval may be repeated alternately.

Hereinafter, the first clock signal and the second clock signal are described assuming that each signal indicates a signal for one period. The above-described frequencies of the first clock signal and the second clock signal are only examples, and the controller 130 may output the first clock signal and the second clock signal of various frequencies other than 1 MHz and 20 MHz if the frequency of the first clock signal is lower than the frequency of the second clock signal.

Here, a repetition number (or the number of rising edges) of the first clock signals included in one first clock interval and a repetition number of the second clock signals included in one second clock interval may be the same as a predetermined number of times.

For example, as shown in FIG. 4A, the second clock signal (20 MHz) may be repeated twenty times during one second clock interval if the first clock signal (1 MHz) is repeated twenty times during one first clock interval. Accordingly, a duration of the first clock interval may be twenty times longer than a duration of the second clock interval. The repetition number of the respective clock signals is only an example, and the controller 130 may output the clock signal for each period based on a set different number of times.

Accordingly, the controller 130 may apply the first clock signal, which is a lower frequency than that of the second clock signal, as the control signal 410 to the scan IC 120 while the sequence signal 430 remains in the high state, and apply the second clock signal as the control signal 410 to the scan IC 120 while the sequence signal 430 remains in the low state.

The scan IC 120 may sequentially apply the scan signal to each line 10 based on the control signal 410 applied by the controller 130. In detail, the scan IC 120 may apply a first scan signal to the first line 10-1 among the plurality of lines based on the first clock signal while the predetermined number of times of first clock signals are input consecutively if the first clock signal is input. In addition, the scan IC 120 may apply a second scan signal to the second line 10-2 among the plurality of lines based on the second clock signal while the predetermined number of times of second clock signals are input consecutively if the second clock signal is input after the predetermined number of times of first clock signals are all input consecutively. That is, the scan IC 120 may count the number of times the clock signals and apply the scan signal to one line 10 among the plurality of lines until the predetermined number of times is reached, if the clock signal included in each clock interval is input. The scan IC 120 may apply the scan signal to the next line if the clock signal is applied the predetermined number of times, and repeat this process.

Meanwhile, a time during which the first scan signal is applied may be greater than or equal to a threshold time for turning on the plurality of LEDs 11 by applying the scan signal to each line 10. On the other hand, a time during which the second scan signal is applied may be less than the threshold time. The threshold time may be a time it takes for a voltage applied to a switch in each LED to reach a threshold voltage. Therefore, the scan may not be performed even though the scan signal is applied to the corresponding line if the scan signal is applied for a time less than the threshold time.

The scan IC 120 needs to apply the scan signal to one line 10 among the plurality of lines for a time greater than or equal to a certain time to turn on the plurality of LEDs 11 included in each line 10 even if the scan IC 120 is designed to sequentially apply the scan signal to each line and be operated in the manner as described above. The plurality of LEDs 11 included in the line 10 is unable to be turned on and may be in the turn-off state if the scan IC 120 applies the scan signal to one line 10 among the plurality of lines for less than the certain time. Therefore, a non-sequential operation may become possible.

For example, the odd and even lines may be non-sequentially scanned, as in the scanning order shown in FIG. 3 if the control signal is generated as shown in FIG. 4A. The scan line voltage 420 shown in FIG. 4A indicates a voltage provided for each line. The scan line voltage 420 indicates that the LED 11 of the corresponding line is in a turn-on state if the scan line voltage 420 is high, and the LED 11 of the corresponding line is in a turn-off state 11-2 if the scan line voltage 420 is low.

In detail, the scan IC 120 may apply the first scan signal to the first line 10-1 or 10-7 for a time greater than or equal to the threshold time if the controller 130 first applies the first clock signal included in the first clock interval to the scan IC 120. Here, the driver IC 140 may supply power to the LEDs included in the vertical line to emit light. Accordingly, the LED disposed at an intersection of the vertical line to which power is supplied and the first line 10-1 or 10-7 may be turned on. The scan IC 120 may no longer apply the first scan signal to the first line 10-1 or 10-7 if the controller 130 outputs all the first clock signals the predetermined number of times.

The scan IC 120 may then receive the next second clock signal after the first clock interval. The scan IC 120 may apply the second scan signal to the second line 10-2 or 10-8. In the case shown in FIG. 4A, the scan IC 120 may apply the second scan signal to the second line 10-2 or 10-8 for a time less than or equal to the threshold time based on the second clock interval of the control signal. Therefore, the LED 11 included in the second line 10-2 or 10-8 may not be turned on and may be in the turn-off state even though the driver IC supplies power.

The scan IC 120 may then receive the control signal 410 of the next first clock interval after the second clock interval. The scan IC 120 may apply the first scan signal to the third line 10-3 or 10-9 during the first clock interval. Similarly, the first scan signal may be applied to the third line 10-3 or 10-9 for the time greater than or equal to the threshold time, and the LED 11 included in the third line 10-3 or 10-9 may thus be turned on. The above-described process may then be repeated if the scan IC 120 receives the control signal corresponding to the second clock interval. Accordingly, the display device 100 may perform the non-sequential scanning operation. Meanwhile, as described above, the sequence signal may include the information on the predetermined scanning order. The controller 130 may output the control signal 410 based on the sequence signal 430. In detail, the control signal 410 may cause the scan IC 120 to non-sequentially scan the plurality of lines to alternately dispose the first clock interval and the second clock interval based on the predetermined scanning order.

Referring to FIG. 4A, the sequence signal 430 may alternately repeat a low period and a high period. In the first cycle of FIG. 4A, an odd-numbered clock interval (i.e., first, third, or fifth clock interval) may be the first clock interval, which is a low-frequency period, and an even-numbered clock interval (i.e., second, fourth, or sixth clock interval) may be the second clock interval, which is a high-frequency period. Accordingly, the first, third, and fifth lines may be sequentially turned on, and the second, fourth, and sixth lines may be in the turn-off state.

In the second cycle, the first clock interval and the second clock interval may be implemented in reverse. That is, the controller 130 may configure the first, third, or fifth clock interval as the second clock interval, which is the high-frequency period, and the second, fourth, or sixth clock interval as the first clock interval, which is the low-frequency period.

The clock interval corresponding to a boundary between the respective cycles may overlap a low frequency or a high frequency. For example, the sixth clock interval, which is the last in a first cycle, may become the second clock interval, which is the high-frequency period, and the first clock interval, which is the first in the second cycle, may also become the second clock interval. Accordingly, a length of the low signal corresponding to the corresponding clock intervals in the sequence signal may become longer than other low signals. For example, the length of the corresponding low signal may become about twice as long as other low signals. In addition, the sixth clock interval, which is the last in the second cycle, may become the first clock interval, which is the low-frequency period, and the first clock interval, which is the first in a third cycle, may also become the first clock interval. Accordingly, a length of the high signal corresponding to the corresponding clock intervals in the sequence signal may become longer than other high signals. For example, the length of the corresponding high signal may become about twice as long as other high signals.

The description above describes the case where the scan IC 120 classifies and non-sequentially scans the odd and even lines based on the control signal 410, which is only an example, and the same principle may be applied to other cases where the scanning is performed in various orders. The specific scanning operation is described in detail in a description provided below.

Meanwhile, the controller 130 may generate the control signal in a form different from the form including the plurality of clock intervals as described above for the scan IC 120 to non-sequentially scan the plurality of lines 10.

A graph 400' shown in FIG. 4*b* shows magnitudes of a control signal 410' and the scan line voltage 420 over time. The controller 130 may generate the control signal 410' and apply the same to the scan IC 120, and the scan IC 120 may non-sequentially scan the plurality of lines 10 based on this control signal 410'.

Each of the plurality of clock intervals included in the control signal 410' may include a pulse signal instead of the plurality of clock signals, unlike the control signal 410 shown in FIG. 4A. That is, the controller 130 may generate the control signal, in which a plurality of different pulses are alternately disposed, and apply the generated control signal to the scan IC 120 for the scan IC 120 to non-sequentially scan the plurality of lines.

Here, each pulse may correspond to one of a pulse 1 and a pulse 2 having different durations (hereinafter, a pulse width) during which the pulse remains in the high state. Here, each pulse may be a signal having the same duty cycle and different clock frequencies, is not limited thereto, and the pulse 1 and the pulse 2 may be signals having the same clock frequency and different duty cycles. Here, the description describes the case where the controller 130 generates the control signal by using two pulses, is not limited thereto, and the controller 130 may generate the control signal 410' by using three or more pulses having different frequencies.

In detail, the pulse 1 may be a signal whose pulse width is greater than or equal to a critical time, and the pulse 2 may be a signal whose pulse width is less than the critical time. Here, the critical time is distinguished from the threshold time described with reference to FIG. 4A. The critical time indicates the minimum duration for which the signal needs to be input in the high state for the scan IC 120 to turn on the plurality of LEDs 11 included in each line 10. The scan IC 120 may apply the scan signal to the corresponding line 10 for the time greater than or equal to the threshold time if the scan IC 120 receives the high-state input for a time greater than or equal to the critical time. In this case, the plurality of LEDs 11 included in the corresponding line 10 may be turned on.

For example, as shown in FIG. 4B, the scan IC 120 may receive a high-state signal for the time greater than or equal to the critical time, and apply the scan signal to the first line for the time greater than or equal to the threshold time if the controller 130 applies a first pulse corresponding to the pulse 1 to the scan IC 120. In this case, the plurality of LEDs included in the first line may be turned on.

The scan IC 120 may apply the scan signal to the next line if the scan IC 120 receives the high-state signal for a pulse width time from the controller 130 and detects a falling edge and the rising edge. That is, the scan IC 120 may receive the high-state signal for a time less than the critical time and apply the scan signal to the second line for a time less than the threshold time if the controller 130 applies a second pulse corresponding to the pulse 2 to the scan IC 120. In this case, the plurality of LEDs included in the second line are unable to be turned on.

Next, the same operation as in the case of applying the first pulse is repeated to thus turn on the LED included in the third line if the controller 130 applies a third pulse corresponding to the pulse 1 to the scan IC 120.

The description describes the case where the odd lines are scanned and the even lines are then scanned (the first, third, fifth, second, fourth, and sixth lines) with reference to FIG. 4B, the present disclosure is not limited thereto, and the controller 130 may generate the various control signal 410', in which the pulse 1 and the pulse 2 are alternately disposed, to scan each line 10 in various orders (for example, if the odd line is scanned after the even line, or if an interval between scanned lines is two or more).

In this way, the controller 130 may generate the control signal 410' based on the predetermined scanning order. That is, the controller 130 may cause the scan IC 120 to scan each line 10 in the predetermined order by generating the pulse 1 for an order of the lines to be turned on, and generating the pulse 2 for the lines not to be turned on.

The controller 130 cause the scan IC 120 to scan each line 10 by applying these control signals 410 or 410' to the scan IC 120. The scan IC 120 may apply the scan signal to each line 10 only during the time that the clock signal included in each clock interval is input for the predetermined number of times. Alternatively, the scan IC 120 may apply the scan signal to each line 10 for a time more than, equal to, or less than the threshold time, based on the duration during which the pulse signal included in each clock interval remains in the high state. Accordingly, the plurality of LEDs 11 arranged in each line 10 of the display 110 may be non-sequentially turned on for each line 10 based on the order in which the first clock interval and the second clock interval are alternately disposed.

Meanwhile, the controller 130 may generate the control signal 410 by using various internal circuits to perform the non-sequential scanning operation as described above.

Figure 5:
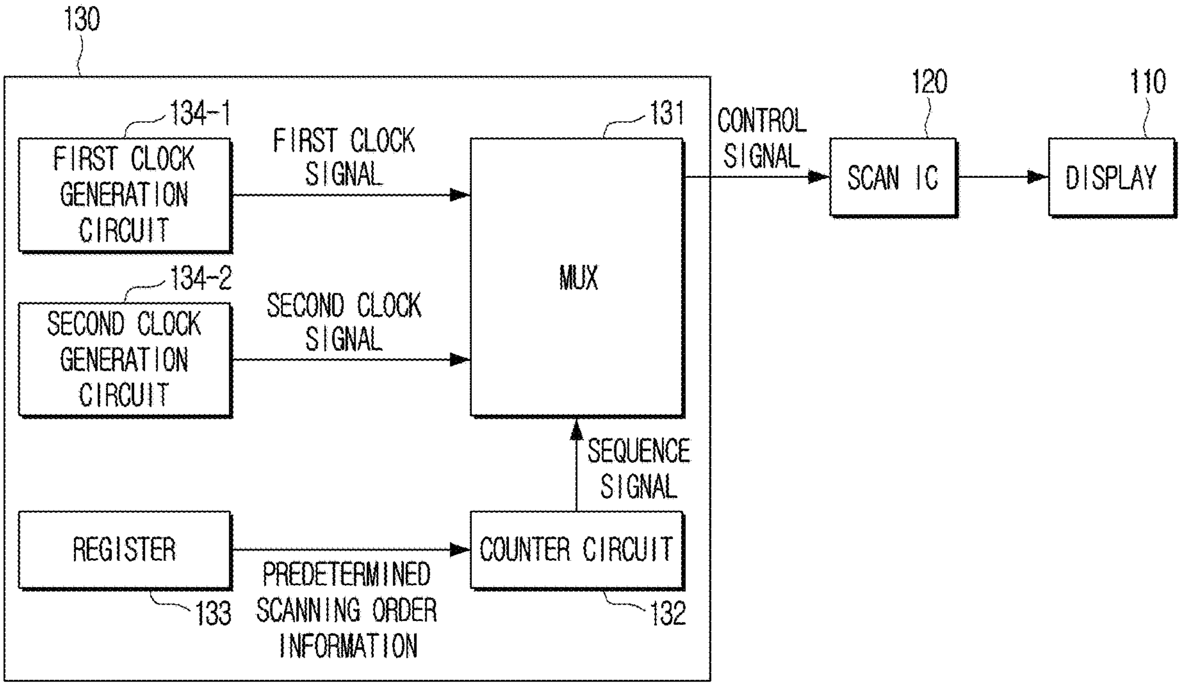
FIG. 5 is a diagram for describing a detailed configuration of a controller according to an embodiment of the disclosure.

FIG. 5 is a diagram for describing a detailed configuration of the controller according to an embodiment.

Referring to FIG. 5, the controller 130 may include a MUX (multiplexer) circuit 131, a counter circuit 132, a register 133, a first clock generation circuit 134-1, and a second clock generation circuit 134-2.

The MUX circuit 131 may generate the control signal 410 by multiplexing the first clock signal with the second clock signal based on the sequence signal 430.

According to an embodiment of the present disclosure, the MUX circuit 131 may correspond to a 2:1 MUX circuit 131. The MUX circuit 131 may receive the first clock signal generated by the first clock generation circuit 134-1 and the second clock signal generated by the second clock generation circuit 134-2, respectively, and may receive the sequence signal 430 through a control line. The MUX circuit 131 may select a signal to be output among the first clock signal or the second clock signal based on a current state (high state or low state) of the sequence signal 430. Accordingly, the MUX circuit 131 may output the first clock signal as many times as the predetermined number of times described above if the MUX circuit 131 selects and outputs the first clock signal. The MUX circuit 131 may output the second clock signal as many times as the predetermined number of times described above if the MUX circuit 131 selects and outputs the second clock signal.

Meanwhile, the MUX circuit 131 may selectively output the first clock signal or the second clock signal based on the sequence signal 430 even if the controller 130 generates the control signal 410' described above, in which the pulse 1 and the pulse 2 are alternately disposed. The MUX circuit 131 may generate the pulse 1 having the pulse width greater than or equal to the critical time if the input sequence signal 430 is in the high state, and generate the pulse 2 having the pulse width less than the critical time if the input sequence signal 430 is in the low state.

The register 133 may store the information on the predetermined scanning order.

The scanning order information may be set in various ways and may be changed by a manufacturer of the display device 100. In detail, the scanning order information stored in the register 133 may be set as sequential operation information for sequentially scanning the plurality of lines 10, non-sequential operation information for performing the non-sequential operation on the plurality of lines 10 in a predetermined number of line units, or the like.

Here, the predetermined number indicates an interval between the lines 10, where the scan IC 120 scans each line to turn on the LED 11 if the scan IC 120 non-sequentially scans each of the plurality of lines 10. For example, the LEDs 11 may be turned on at one line interval, and the predetermined number may correspond to 1 if the scan IC 120 scans each line 10 based on the steps shown in FIG. 3. In addition, the non-sequential operation information may include various operation information such as non-sequential mode information for performing the operation by hopping two line units, non-sequential mode information for performing the operation by hopping three or more line units, and non-sequential mode information for performing the operation by hopping randomly.

Meanwhile, the scanning order information stored in register 133 may be updatable. That is, based on a purpose of the display device 100, the sequential operation information stored in the register 133 may be updated to the non-sequential operation information, and the non-sequential operation information stored in the register 133 may be updated to sequential operation information. In addition, for one display device 100, different operation information may be stored in the register 133 over time. For example, for testing a product before its launch, the sequential operation information may be stored in the register 133, and an image quality in case of performing the scanning in a sequential operation mode may be tested. The product may then be released by changing the sequential operation information to the non-sequential operation information.

If the operation information stored in the register 133 is changed, the sequence signal output from the counter circuit 132 may also be changed, and as a result, the clock interval of the control signal output by the controller 130 may also be variously changed.

Meanwhile, the counter circuit 132 may be connected to the MUX circuit 131 through the control line as described above, and transmit the sequence signal 430 corresponding to the information stored in the register to the MUX circuit 131. As described above, the MUX circuit 131 may select one of the first clock signal or the second clock signal based on the sequence signal 430 and output the same as the control signal.

The first clock generation circuit 134-1 may generate the first clock signal, and the second clock generation circuit 134-2 may generate the second clock signal as described above. The controller 130 may output the control signal 410 by using the first clock signal or the second clock signal. The frequency of the second clock signal may be set to be higher than the frequency of the first clock signal.

Meanwhile, the controller 130 may generate the control signal 410 by using two clock generation circuits as described above, or generate the control signal by using one clock generation circuit.

Figure 6:
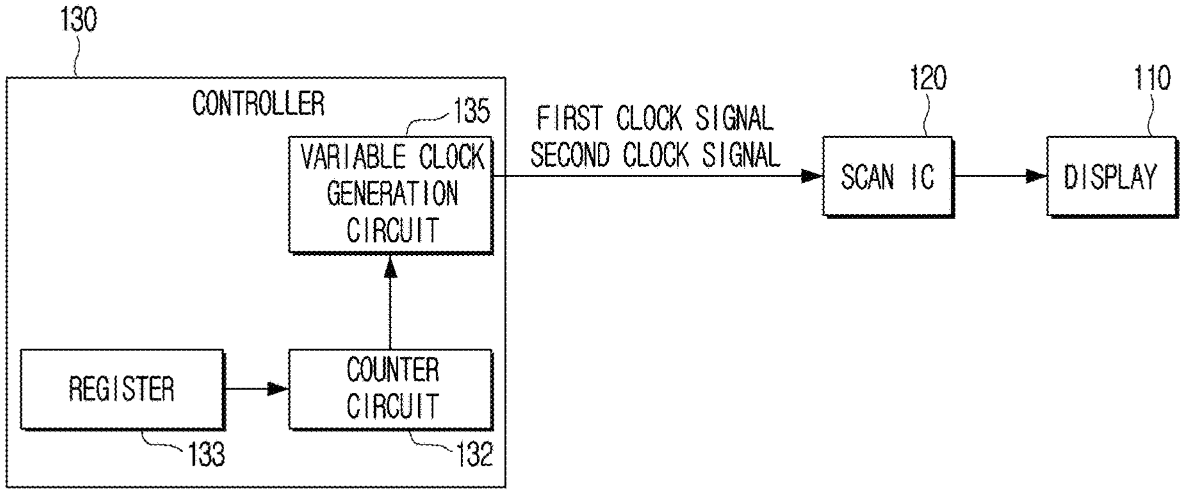
FIG. 6 is a diagram for describing a variable clock generation circuit included in a controller according to an embodiment of the disclosure.

FIG. 6 is a diagram for describing a variable clock generation circuit included in the controller according to an embodiment.

Referring to FIG. 6, the controller 130 may include a variable clock generation circuit 135. The variable clock generation circuit 135 may selectively output the first clock signal or the second clock signal based on the sequence signal 430. Similar to the controller 130 generating the control signal by using the two clock generation circuits 134-1 and 134-2 described above, the counter circuit 132 may output the sequence signal 430 corresponding to the information on the predetermined scanning order that is stored in the register 133 and apply the same to the variable clock generation circuit 135.

The variable clock generation circuit 135 may output the first clock signal if the applied sequence signal 430 is in the high state, and output the second clock signal if the applied sequence signal 430 is in the low state. The variable clock generation circuit 135 may output the first clock signal or the second clock signal repeatedly the predetermined number of times described above if the variable clock generation circuit 135 outputs the first clock signal or the second clock signal. In this case, the signal output by the variable clock generation circuit 135 may become the control signal 410.

Meanwhile, the variable clock generation circuit 135 may selectively output the first clock signal or the second clock signal based on the sequence signal 430 even if the controller 130 generates the control signal 410' described above, in which the pulse 1 and the pulse 2 are alternately disposed. The variable clock generation circuit 135 may generate the pulse 1 having the pulse width greater than or equal to the critical time if the input sequence signal 430 is in the high state, and generate the pulse 2 having the pulse width less than the critical time if the input sequence signal 430 is in the low state.

The variable clock generation circuit 135 may apply the control signal 410 or 410' as described above to the scan IC 120, and the scan IC 120 may apply the first scan signal or the second scan signal to each line 10 included in the display 110 based on the control signal 410.

As described above, the controller 130 may cause the scan IC 120, which is originally designed to sequentially scan each line 10, to scan each line 10 in a desired order in case of using the two clock generation circuits 134-1 and 134-2 or the variable clock generation circuit.

Meanwhile, the control signal including two clock intervals, such as the first and second clock intervals, is shown and described above. However, the number of clock intervals included in the control signal may be three or more.

Figure 7A:
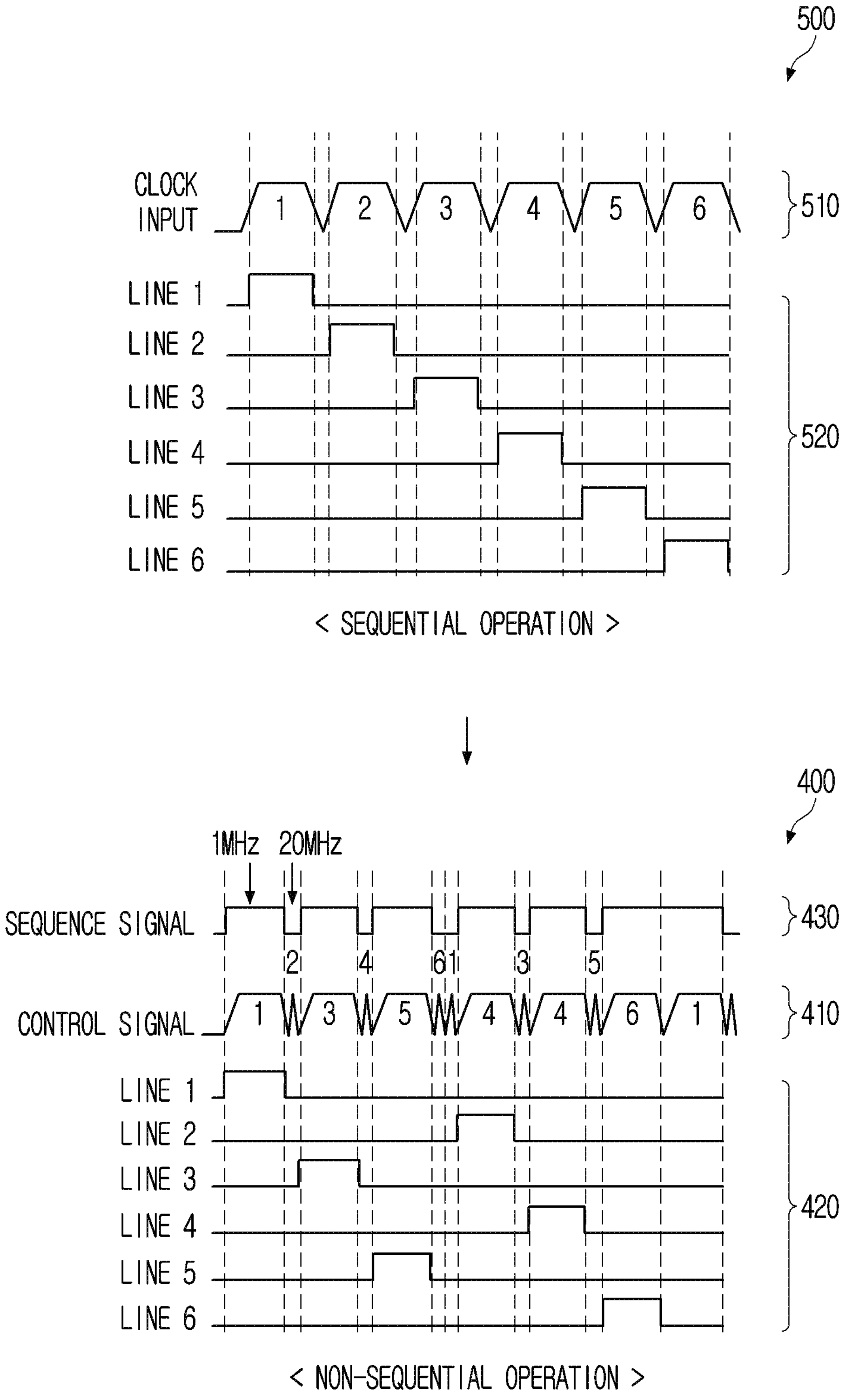
FIG. 7A is a diagram for describing a sequential scanning operation and a non-sequential scanning operation according to an embodiment of the disclosure.
Figure 7B:
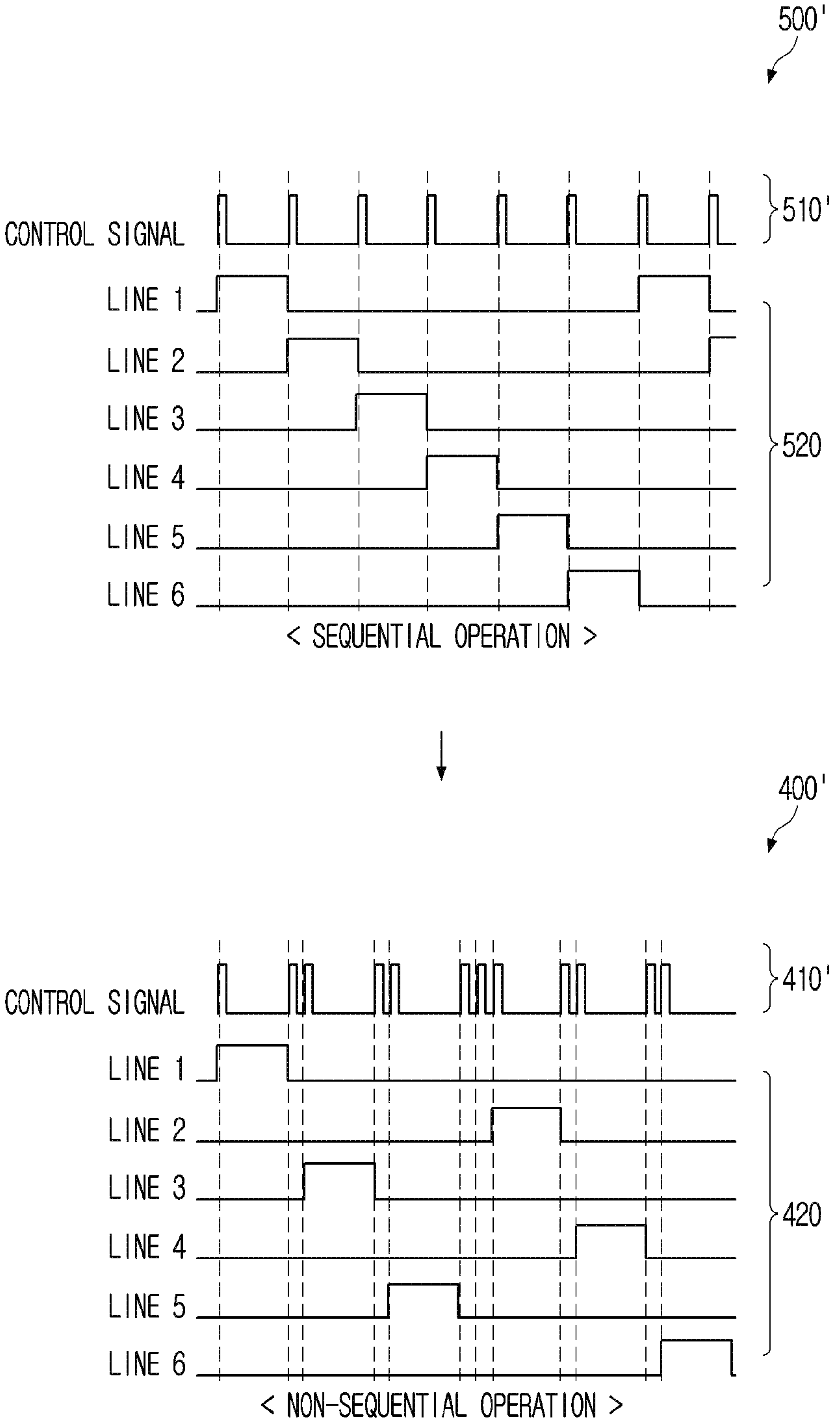
FIG. 7B is a diagram for describing a sequential scanning operation and a non-sequential scanning operation according to an embodiment of the disclosure.

FIGS. 7A and 7B are diagrams for describing a process in which the display device is switched from performing the sequential scanning operation to the non-sequential scanning operation according to an embodiment of the present disclosure.

Referring to FIG. 7A, an upper graph 500 shows a case where the controller 130 applies a clock signal 510 having a fixed frequency to the scan IC 120, and the scan IC 120 sequentially scans each line 10 included in the display 110. As described above, the scan IC 120 may perform the sequential operation if the sequential operation information is stored in the register 133. In this case, referring to each line voltage 520, the plurality of LEDs 11 of each line 10 may be turned on in an order from top to bottom based on an arrangement order of each line 10.

A lower graph 400 shows a case where each line 10 is scanned in an order different from the above order based on the above-mentioned control signal 410. As described above, the scan IC 120 may implement the non-sequential operation even if the scan IC 120 is designed to perform the sequential operation in case of updating the sequential operation information stored in the register 133 to the non-sequential operation information. In this case, referring to each line voltage 420, the plurality of LEDs 11 of each line 10 may be turned on based on the predetermined scanning order, which is different from the arrangement order of each line 10.

Meanwhile, the display device 100 may selectively perform the sequential operation or the non-sequential operation as needed. Here, the sequential operation mode and the non-sequential operation mode may be described as a first mode and a second mode, respectively. For example, in a process step of the display device 100, the scan IC 120 may need to sequentially scan each line 10 to detect an LED element defect or the like. In this case, an inspector may input a control command to change the operation mode to the first mode for performing the sequential operation through the external device or the like connected to the display device 100. The external device may be changed to the first mode by inputting the sequential operation information into the register 133 or by selecting the sequential operation information from the plurality of operation information pre-stored in the register 133. If the display device 100 passes the process step, the inspector may change the operation mode to the second mode by changing the operation information of the register 133 to the non-sequential operation information, or by selecting the non-sequential operation information from the plurality of pre-stored operation information.

In addition, in some cases, the display device 100 may need to be switched to the first mode and operated even while the display device 100 is operated in the second mode. For example, a user may change the operation information of the register 133 by manipulating a setting menu or the like if the user wants to change the operation mode to the sequential operation mode or another non-sequential operation mode while the display device 100 is operated in the non-sequential operation mode.

Meanwhile, referring to FIG. 7B, the display device 100 may perform the sequential scanning operation and then be switched to the non-sequential scanning operation even if the controller 130 generates the control signal 410' based on the pulse 1 or the pulse 2 described above.

In an upper graph 500', the scan IC 120 may sequentially scan each line 10 included in the display 110 if the controller 130 applies the pulse 1 to the scan IC 120 at a constant time interval. As in the case shown in FIG. 7A, the scan IC 120 may perform the sequential operation if the sequential operation information is stored in the register 133.

A lower graph 400' shows a case where each line 10 is scanned in an order different from the above order based on the above-mentioned control signal 410'. In this case, the non-sequential operation may also be implemented by using the scan IC 120 for the sequential operation.

That is, the controller 130 may non-sequentially scan each line 10 by applying the special control signal 410 or 410' including the clock signal (e.g., first clock signal or second clock signal) having a different frequency or including the pulse signal (e.g., pulse 1 or pulse 2) having a different pulse width to the scan IC 120 designed for the sequential operation based on the sequence signal 430.

Meanwhile, as described above with reference to FIG. 3, the controller 130 may apply, to the scan IC, the control signal 410 for sequentially scanning the odd lines 10-1, 10-3, 10-5, 10-7, 10-9, and 10-11 among the plurality of lines 10, and then scanning the even lines 10-2, 10-4, 10-6, 10-8, 10-10, and 10-12. However, the controller 130 may apply the control signal 410 to the scan IC 120 to scan the lines in various patterns by changing the predetermined number.

Figure 8:
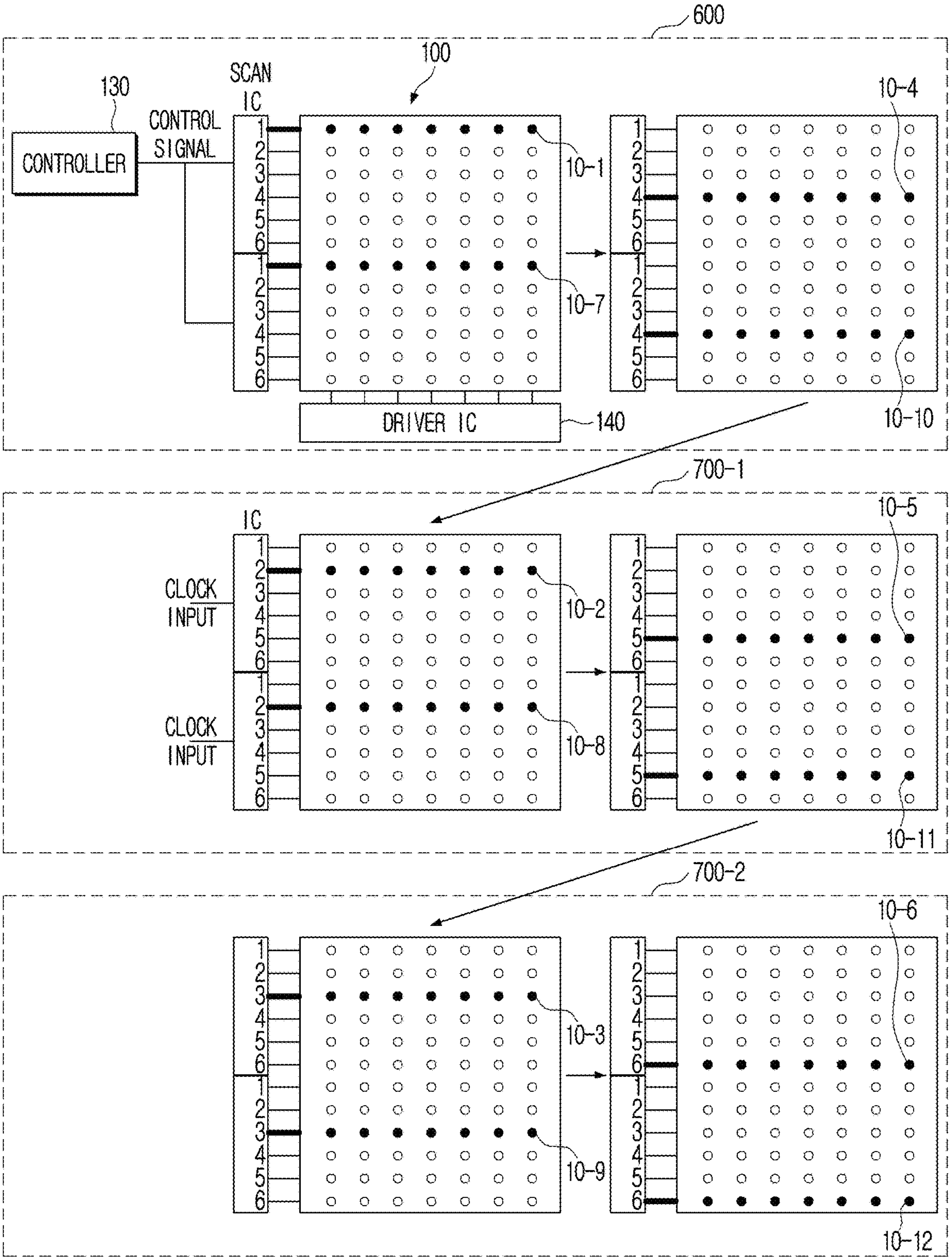
FIG. 8 is a diagram for describing various non-sequential scanning operations according to an embodiment of the disclosure.

FIG. 8 is a diagram for describing various non-sequential scanning operations according to an embodiment.

Referring to FIG. 8, the controller 130 may apply, to the scan IC 120, the control signal 410 for sequentially scanning the plurality of lines 10-1, 10-4, 10-7, and 10-10 by hopping the predetermined number of line units, and then sequentially scanning the remaining lines 10-2, 10-5, 10-3, 10-6, 10-8, 10-11, 10-9, and 10-12 by hopping the predetermined number of line units. Here, hopping the plurality of lines indicates that the scan IC 120 scans one line, then skips the predetermined number of lines, and scans the next line.

Here, the entire scanning operation period for the plurality of lines 10-1 to 10-12 may be classified into a first scanning operation period 600 for some lines 10-1, 10-4, 10-7, and 10-10 among the plurality of lines 10-1 to 10-12 and at least one second scanning operation period 700-1 or 700-2 for some other lines 10-2, 10-3, 10-5, 10-6, 10-8, 10-9, 10-11, and 10-12 among the plurality of lines 10-1 to 10-12.

In this case, the controller 130 may apply the control signal corresponding to the scanning operation period as described above to the scan IC 120. In detail, the control signal may be a signal for scanning the plurality of lines 10-1, 10-4, 10-7, and 10-10 by hopping at least one line unit during the first scanning operation period 600, and then scanning the remaining lines 10-2, 10-3, 10-5, 10-6, 10-8, 10-9, 10-11, and 10-12 among the plurality of lines by hopping at least one line unit during at least one second scanning operation period 700.

Upon specifically examining the first scanning operation period, the next line to be scanned in this manner may not be present if the scan IC 120 scans an initial line 10-1 or 10-7, and then scans the specific line 10-4 or 10-10 by hopping the predetermined number of line units. Here, an operation period from a time at which the scan IC 120 scans the initial line to a time at which the scan IC 120 scans the specific line 10-4 or 10-10 may be referred to as the first scanning operation period 600.

Upon specifically examining the second scanning operation period, the scan IC 120 may first scan the next line 10-2 or 10-8 of the initially scanned line 10-1 or 10-7 during the first scanning operation period described above. The scan IC 120 may then scan the specific line 10-5 or 10-11 by hopping the predetermined number of line units. Here, the next line to be scanned in this manner may not be present. In this case, an operation period from a time at which the scan IC 120 scans the next line 10-2 or 10-8 described above to a time at which the scan IC 120 scans the specific line 10-5 or 10-11 may be referred to as the second scanning operation period 700-1.

The scan IC 120 may first scan the next line 10-3 or 10-9 of the initially scanned line 10-2 or 10-8 during the second scanning operation period 700-1. The scan IC 120 may perform the scanning up to the specific line 10-6 or 10-12 in the same manner as during the second scanning operation period 700-1. In this case, an operation period from a time at which the scan IC 120 scans the above-described next line 10-3 or 10-10 to a time at which the scan IC 120 scans the specific line 10-6 or 10-12 may be defined as the second scanning operation period 700-2.

The scan IC 120 may scan all the lines 10-1 to 10-12 until the second scanning operation period 700-2 ends. In this case, the scanning operation period for all the lines may include the first scanning operation period 600 and the two second scanning operation periods 700-1 and 700-2. The same first scanning operation period and second scanning operation period may then be repeated based on the control signal 410 applied to the scan IC 120.

However, as shown in FIG. 3, the scan IC 120 may scan the odd lines 10-1, 10-3, 10-5, 10-7, 10-9, and 10-11 during the first scanning operation period 200, and scan the even lines 10-2, 10-4, 10-6, 10-8, 10-10, and 10-12 during the second scanning operation period 300. In this case, only one second scanning operation period 300 may be included in the scanning operation period for all the lines.

According to yet another embodiment, the scanning operation period for all the lines may include up to three second scanning operation periods if the predetermined number corresponds to three. The scanning operation period for all the lines may include up to four second scanning operation periods if the predetermined number corresponds to four.

In this way, the controller 130 may apply the control signal 410 to the scan IC 120 by disposing the first clock interval and the second clock interval in various ways for the scan IC 120 to scan each line by varying the predetermined number. Information on the predetermined number may be temporarily stored in the register 133, and the predetermined number may be updated to a different number.

The predetermined number may be set in various ways, and the scan IC 120 may thus scan each line 10 among the plurality of lines in various patterns, thereby increasing its usability.

Meanwhile, according to still another embodiment, the controller 130 may apply, to the scan IC 120, the control signal for scanning the plurality of lines 10 by hopping at least one line unit during the first scanning operation period and the second scanning operation period. That is, the controller 130 may output the control signal that causes the scan IC to scan the lines 10 at a different interval therebetween for each scanning operation period 600 or 700.

Meanwhile, according to an embodiment, the controller 130 may adjust the scanning order differently for each of the plurality of scanning operation periods. Here, each of the plurality of scanning operation periods may indicate one scanning operation period for all the lines 10-1 to 10-12 described above.

For example, in the scanning operation shown in FIG. 8, the predetermined number may correspond to two. During the first scanning operation period, the controller 130 may apply, to the scan IC 120, the control signal for causing the scan IC 120 to perform the scanning by hopping the predetermined number of line units.

During the second scanning operation period, the controller 130 may then adjust the scanning order differently and output a new control signal. The new control signal may be a signal output by adjusting the predetermined number from two to three.

The scan IC 120 may sequentially scan the first line 10-1 or 10-7 and the fifth line 10-5 or 10-11 during the first scanning operation period if the new control signal is applied to the scan IC 120. The scan IC 120 may then sequentially scan the second line 10-2 or 10-8 and the sixth line 10-6 or 10-12 during the first second scanning operation period. The scan IC 120 may then scan the third line 10-3 or 10-9 during the second scanning operation period. Finally, the scan IC 120 may scan the fourth line 10-4 or 10-10 during the third second scanning operation period.

In the third scanning operation period, after the second scanning operation period as above, the controller 130 may again adjust the scanning order differently from that in the second scanning operation period. The controller 130 may then also repeat this process.

In this way, the controller 130 may solve the flicker problem in the various ways by adjusting the scanning order differently based on the plurality of scanning operation periods, thereby increasing the usability of the display device 100.

Figure 9:
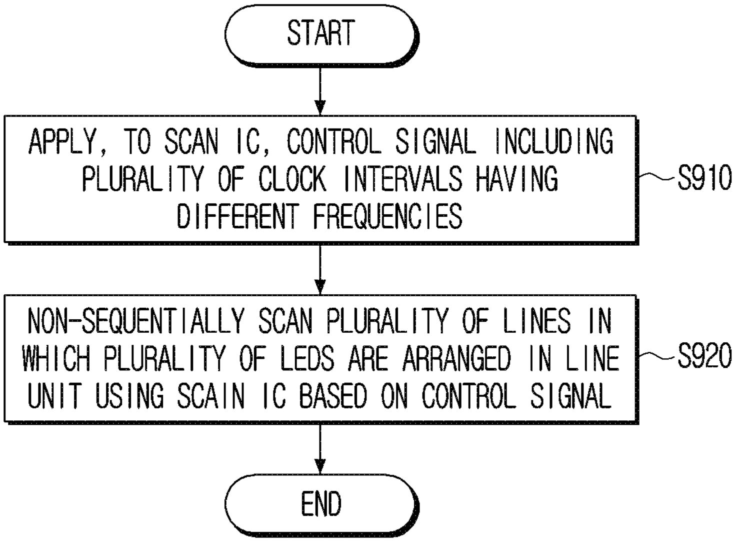
FIG. 9 is a flowchart for describing a scanning method of a display device according to an embodiment of the disclosure.

FIG. 9 is a flowchart for describing a scanning method of a display device according to an embodiment.

Referring to FIG. 9, the display device may apply, to the scan IC, the control signal including the plurality of clock intervals having the different frequencies (S910). The control signal including the plurality of clock intervals having the different frequencies or the like is described in the various embodiments described above, and its redundant description is thus omitted.

The scan IC may non-sequentially scan the plurality of lines in which the plurality of LEDs are arranged in the line unit based on the control signal (S920). Here, the scan IC may be an IC designed to sequentially scan the plurality of LEDs in the line unit. In the various embodiments described above, it is described that the operation of non-sequentially scanning each line based on the control signal if the control signal is applied to the scan IC, and its redundant description is thus omitted.

The scanning method shown in FIG. 9 may be performed by the display device having the same configuration as shown in FIG. 1, 5 or 6, is not necessarily limited thereto, and may also be performed by a device having a different configuration.

In addition, the various embodiments described above may be implemented independently for each embodiment, or may be entirely or partially implemented in combination with various other embodiments of the present disclosure.

Meanwhile, the methods according to the various embodiments of the present disclosure described above may be implemented only by software upgrade or hardware upgrade of the conventional display device.

In addition, the various embodiments of the present disclosure described above may be performed by an embedded server disposed in the display device, or by a server disposed outside the display device.

In addition, each of the components (e.g., modules or programs) according to the various embodiments described above may include a single entity or a plurality of entities, and some of the corresponding sub-components described above may be omitted or other sub-components may be further included in the various embodiments. Alternatively or additionally, some of the components (e.g., modules or programs) may be integrated into the single entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Although the embodiments are shown and described in the present disclosure as above, the present disclosure is not limited to the above-described specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A display device comprising:

a display including a plurality of light emitting devices (LEDs) arranged in a plurality of lines;

a scan integrated circuit (IC) configured to scan the plurality of lines in which the plurality of LEDs are arranged; and a controller configured to apply, to the scan IC, a control signal including a plurality of clock intervals having different frequencies, wherein, based on a frequency of each respective clock interval of the plurality of clock intervals included in the control signal received from the controller, the scan IC non-sequentially scans the plurality of lines, and the frequencies are determined differently depending on whether at least one of the plurality of LEDs can be turned on according to a predetermined number of times that an applied clock signal is input to the scan IC during each respective clock interval of the plurality of clock intervals.

2. The display device as claimed in claim 1, wherein the scan IC is configured to sequentially scan the plurality of lines, the controller is configured to:

generate the control signal, in which a first clock interval of the plurality of clock intervals having different frequencies and a second clock interval of the plurality of clock intervals having different frequencies are alternately disposed based on a predetermined scanning order, and apply the generated control signal to the scan IC for the scan IC to non-sequentially scan the plurality of lines, and a frequency of a second clock signal included in the second clock interval is higher than a frequency of a first clock signal included in the first clock interval.

3. The display device as claimed in claim 2, wherein the first clock signal is repeated in the first clock interval a predetermined number of times, and the second clock signal is repeated in the second clock interval the predetermined number of times, the scan IC is configured to:

if the first clock signal is received, apply a first scan signal to one line among the plurality of lines based on the first clock signal while the first clock signal is repeated consecutively the predetermined number of times, and if the second clock signal is received after the received first clock signal is repeated consecutively the predetermined number of times, apply a second scan signal to a next line among the plurality of lines based on the second clock signal while the second clock signal is repeated consecutively the predetermined number of times, a time during which the first scan signal is applied is greater than or equal to a threshold time for turning on LEDs among the plurality of LEDs included in each respective line among the plurality of lines, and a time during which the second scan signal is applied is less than the threshold time.

4. The display device as claimed in claim 2, wherein the controller includes:

a first clock generation circuit configured to generate the first clock signal, a second clock generation circuit configured to generate the second clock signal, a multiplexer (MUX) circuit, a counter circuit, and a register storing information on the predetermined scanning order, the counter circuit is configured to transmit a sequence signal corresponding to the information stored in the register to the MUX circuit, and the MUX circuit is configured to generate the control signal by multiplexing the first clock signal with the second clock signal based on the sequence signal.

5. The display device as claimed in claim 2, wherein the controller includes:

a register storing information on the predetermined scanning order, a counter circuit configured to output a sequence signal corresponding to the information stored in the register, and a variable clock generation circuit configured to selectively output the first clock signal and the second clock signal based on the sequence signal.

6. The display device as claimed in claim 4, wherein the information on the predetermined scanning order stored in the register is one of sequential operation information for sequentially scanning the plurality of lines or non-sequential operation information for performing the non-sequential operation on the plurality of lines in a predetermined number of lines among the plurality of lines, and the scanning order information is updatable.

7. The display device as claimed in claim 2, wherein the controller is configured to apply, to the scan IC, the control signal for sequentially scanning odd lines among the plurality of lines and then sequentially scanning even lines among the plurality of lines, and the control signal sequentially disposes the first clock interval corresponding to a line to be scanned among the plurality of lines and the second clock interval corresponding to a line not to be scanned among the plurality of lines.

8. The display device as claimed in claim 2, wherein the controller is configured to apply, to the scan IC, the control signal for sequentially scanning the plurality of lines by hopping a predetermined number of lines among the plurality of lines, and then sequentially scanning remaining lines among the plurality of lines by hopping the predetermined number of lines, the control signal sequentially disposes the first clock interval corresponding to a line to be scanned among the plurality of lines and the second clock interval corresponding to a line not to be scanned among the plurality of lines, and the predetermined number is two, three, or four.

9. The display device as claimed in claim 2, wherein a scanning operation period for all of the plurality of lines includes a first scanning operation period for some lines among the plurality of lines and at least one second scanning operation period for some other lines among the plurality of lines, the controller is configured to apply, to the scan IC, the control signal for scanning the plurality of lines by hopping at least one line among the plurality of lines during the first scanning operation period, and then scanning remaining lines among the plurality of lines by hopping at least one line among the plurality of lines during the at least one second scanning operation period, and the control signal sequentially disposes the first clock interval corresponding to a line to be scanned among the plurality of lines and the second clock interval corresponding to a line not to be scanned among the plurality of lines.

10. The display device as claimed in claim 2, wherein a scanning operation period for all of the plurality of lines includes a first scanning operation period for some lines among the plurality of lines and at least one second scanning operation period for some other lines among the plurality of lines, and the controller is configured to adjust the scanning order differently for each of the first scanning operation period and the second scanning operation period.

11. A scanning method of a display device, which includes a plurality of light emitting devices (LEDs) arranged in a plurality of lines, and a scan integrated circuit (IC) configured to scan the plurality of lines in which the plurality of LEDs are arranged, the method comprising:

applying, to the scan IC, a control signal including a plurality of clock intervals having different frequencies; and based on a frequency of each respective clock interval of the plurality of clock intervals included in the applied control signal, non-sequentially scanning, by the scan IC, the plurality of lines, the frequencies are determined differently depending on whether at least one of the plurality of LEDs can be turned on according to a predetermined number of times that an applied clock signal is input to the scan IC during each respective clock interval of the plurality of clock intervals.

12. The method as claimed in claim 11, wherein the scan IC is configured to sequentially scan the plurality of lines, the applying of the control signal to the scan IC includes generating the control signal, in which a first clock interval of the plurality of clock intervals having different frequencies and a second clock interval of the plurality of clock intervals having different frequencies are alternately disposed based on a predetermined scanning order, and a frequency of a second clock signal included in the second clock interval is higher than a frequency of a first clock signal included in the first clock interval.

13. The method as claimed in claim 12, wherein the first clock signal is repeated in the first clock interval a predetermined number of times, and the second clock signal is repeated in the second clock interval the predetermined number of times, the non-sequential scanning includes:

if the first clock signal is received, applying a first scan signal to one line among the plurality of lines based on the first clock signal while the first clock signal is repeated consecutively the predetermined number of times, and if the second clock signal is received after the received first clock signal is repeated consecutively the predetermined number of times, applying a second scan signal to a next line among the plurality of lines based on the second clock signal while the second clock signal is repeated consecutively the predetermined number of times, a time during which the first scan signal is applied is greater than or equal to a threshold time for turning on LEDs among the plurality of LEDs included in each respective line among the plurality of lines, and a time during which the second scan signal is applied is less than the threshold time.

14. The method as claimed in claim 12, wherein the generating of the control signal includes:

generating the first clock signal and the second clock signal, respectively, and generating the control signal by multiplexing the first clock signal with the second clock signal based on scanning order information stored in a register.

15. The method as claimed in claim 12, wherein the generating of the control signal includes generating the first clock signal and the second clock signal by controlling a variable clock generation circuit based on scanning order information stored in a register.

* * * * *